(12) United States Patent
Barbic

(10) Patent No.: US 7,468,562 B1
(45) Date of Patent: Dec. 23, 2008

(54) INTERMITTANT ELECTRICAL CHARGING AC/DC DRIVING SYSTEM

(76) Inventor: Mato Barbic, 1105 2008 Fullerton Avenue, North Vancouver, British Columbia (CA) V7P 3G7

( * ) Notice: Subject to any disclaimer, the term of this patent is extended or adjusted under 35 U.S.C. 154(b) by 0 days.

(21) Appl. No.: 11/616,007

(22) Filed: Dec. 25, 2006

(51) Int. Cl.
*F02D 29/06* (2006.01)
*H02P 9/04* (2006.01)
*B60K 1/00* (2006.01)
*B60K 16/00* (2006.01)
*B60L 8/00* (2006.01)

(52) U.S. Cl. ............ 290/40 C; 180/65.1; 180/65.3; 180/65.7; 180/65.8

(58) Field of Classification Search ........... 290/40 C; 180/65, 65.1–65.8
See application file for complete search history.

(56) References Cited

U.S. PATENT DOCUMENTS

| | | | | |
|---|---|---|---|---|
| 2,607,027 A * | 8/1952 | Ludwig et al. | ...... | 320/123 |
| 3,499,163 A * | 3/1970 | Verreault | ...... | 290/16 |
| 3,521,722 A * | 7/1970 | Dimonte | ...... | 180/65.1 |
| 3,812,929 A * | 5/1974 | Farque | ...... | 180/167 |
| 3,861,485 A * | 1/1975 | Busch | ...... | 180/65.7 |
| 3,861,487 A * | 1/1975 | Gill | ...... | 180/65.3 |
| 3,882,950 A * | 5/1975 | Strohlein | ...... | 180/165 |
| 4,024,926 A * | 5/1977 | Butoi | ...... | 180/65.3 |
| 4,218,624 A * | 8/1980 | Schiavone | ...... | 290/45 |
| 4,254,843 A * | 3/1981 | Han et al. | ...... | 180/165 |
| 4,298,082 A * | 11/1981 | Ramos | ...... | 180/65.8 |
| 4,405,028 A * | 9/1983 | Price | ...... | 180/65.7 |
| 4,588,040 A * | 5/1986 | Albright et al. | ...... | 180/165 |
| 4,602,694 A * | 7/1986 | Weldin | ...... | 180/2.2 |
| 4,632,205 A * | 12/1986 | Lewis | ...... | 180/165 |
| 4,953,646 A * | 9/1990 | Kim | ...... | 180/65.4 |
| 5,081,365 A * | 1/1992 | Field et al. | ...... | 290/45 |
| 5,215,156 A * | 6/1993 | Stulbach et al. | ...... | 180/65.3 |
| 5,384,521 A * | 1/1995 | Coe | ...... | 318/161 |
| 5,495,132 A * | 2/1996 | Shultz et al. | ...... | 310/211 |
| 6,118,237 A * | 9/2000 | Kikuchi et al. | ...... | 318/139 |
| 6,179,078 B1 * | 1/2001 | Belloso | ...... | 180/69.6 |
| 6,306,056 B1 * | 10/2001 | Moore | ...... | 475/5 |
| 6,387,007 B1 * | 5/2002 | Fini, Jr. | ...... | 475/268 |
| 6,442,454 B1 * | 8/2002 | Akiba et al. | ...... | 701/22 |
| 6,524,217 B1 * | 2/2003 | Murakami et al. | ...... | 477/5 |
| 6,579,201 B2 * | 6/2003 | Bowen | ...... | 475/5 |
| 6,591,593 B1 * | 7/2003 | Brandon et al. | ...... | 56/10.6 |
| 6,617,703 B2 * | 9/2003 | Matsubara et al. | ...... | 290/40 C |
| 6,661,109 B2 * | 12/2003 | Fukasaku et al. | ...... | 290/40 C |
| 6,684,970 B2 * | 2/2004 | Gotou | ...... | 180/65.2 |
| 6,717,281 B1 * | 4/2004 | Brandon et al. | ...... | 290/40 C |
| 6,856,035 B2 * | 2/2005 | Brandon et al. | ...... | 290/40 C |
| 6,862,511 B1 * | 3/2005 | Phillips et al. | ...... | 701/54 |
| 6,907,337 B2 * | 6/2005 | Phillips et al. | ...... | 701/51 |
| 6,915,198 B2 * | 7/2005 | Phillips et al. | ...... | 701/54 |

(Continued)

*Primary Examiner*—Nicholas Ponomarenko
*Assistant Examiner*—Pedro J Cuevas
(74) *Attorney, Agent, or Firm*—Michael I Kroll

(57) ABSTRACT

An electrical system to provide a continuous source of energy AC/DC within a vehicle. This system charges the batteries thus exerting a natural braking effect on the motor at those times when it is desired to slow the forward motion of the vehicle such as when going down hill or needing to come to a stop. Due to the batteries being thus intermittently charged, somewhat smaller batteries may be used than are used in the prior art, and the recharging interval can be lengthened. The system is environmentally friendly, with zero emissions and is economical to operate. In addition, the vehicle is quiet and gives a smooth ride.

4 Claims, 8 Drawing Sheets

U.S. PATENT DOCUMENTS

| | | | |
|---|---|---|---|
| 6,965,173 B2 * | 11/2005 | Fukasaku et al. | 290/40 C |
| 7,040,433 B2 * | 5/2006 | Yamamoto et al. | 180/65.2 |
| 7,104,347 B2 * | 9/2006 | Severinsky et al. | 180/65.2 |
| 7,152,705 B2 * | 12/2006 | Alster et al. | 180/65.2 |
| 7,279,855 B2 * | 10/2007 | Tahara et al. | 318/46 |
| 7,316,283 B2 * | 1/2008 | Yamamoto et al. | 180/65.2 |
| 7,325,638 B1 * | 2/2008 | Belloso et al. | 180/69.6 |
| 7,347,294 B2 * | 3/2008 | Gonzalez | 180/65.1 |
| 7,383,902 B2 * | 6/2008 | Matsuzaki et al. | 180/65.2 |
| 7,410,023 B2 * | 8/2008 | Crombez | 180/197 |
| 2001/0017225 A1 * | 8/2001 | Yamamoto et al. | 180/65.2 |
| 2001/0019210 A1 * | 9/2001 | Fukasaku et al. | 290/40 C |
| 2002/0023789 A1 * | 2/2002 | Morisawa et al. | 180/65.2 |
| 2002/0087252 A1 * | 7/2002 | Shimizu et al. | 701/84 |
| 2002/0100624 A1 * | 8/2002 | Joong et al. | 180/65.4 |
| 2002/0139592 A1 * | 10/2002 | Fukasaku et al. | 180/65.2 |
| 2003/0042054 A1 * | 3/2003 | Matsubara et al. | 180/65.2 |
| 2003/0042807 A1 * | 3/2003 | Blake | 310/66 |
| 2003/0216215 A1 * | 11/2003 | Suzuki et al. | 477/5 |
| 2004/0038775 A1 * | 2/2004 | Shimizu et al. | 477/6 |
| 2004/0040375 A1 * | 3/2004 | Kadota et al. | 73/116 |
| 2004/0040758 A1 * | 3/2004 | Shimizu | 180/65.2 |
| 2004/0040759 A1 * | 3/2004 | Shimizu et al. | 180/65.2 |
| 2004/0040760 A1 * | 3/2004 | Kadota | 180/65.2 |
| 2004/0040775 A1 * | 3/2004 | Shimizu et al. | 180/337 |
| 2004/0040817 A1 * | 3/2004 | Shimizu et al. | 192/103 R |
| 2004/0070270 A1 * | 4/2004 | Gunji | 303/152 |
| 2004/0104059 A1 * | 6/2004 | Yamamoto et al. | 180/65.2 |
| 2004/0130159 A1 * | 7/2004 | Brandon et al. | 290/40 C |
| 2004/0134698 A1 * | 7/2004 | Yamamoto et al. | 180/65.2 |
| 2004/0135527 A1 * | 7/2004 | Tatara et al. | 318/139 |
| 2004/0147366 A1 * | 7/2004 | Aoki et al. | 477/6 |
| 2004/0263099 A1 * | 12/2004 | Maslov et al. | 318/254 |
| 2005/0029816 A1 * | 2/2005 | Brandon et al. | 290/40 C |
| 2005/0052080 A1 * | 3/2005 | Maslov et al. | 307/10.1 |
| 2005/0060076 A1 * | 3/2005 | Phillips et al. | 701/51 |
| 2005/0060079 A1 * | 3/2005 | Phillips et al. | 701/53 |
| 2005/0060080 A1 * | 3/2005 | Phillips et al. | 701/54 |
| 2005/0061567 A1 * | 3/2005 | Kim | 180/243 |
| 2005/0103551 A1 * | 5/2005 | Matsuno | 180/243 |
| 2005/0115748 A1 * | 6/2005 | Lanier | 180/65.1 |
| 2005/0115755 A1 * | 6/2005 | Sakai et al. | 180/243 |
| 2005/0133285 A1 * | 6/2005 | Shimizu | 180/65.2 |
| 2005/0139401 A1 * | 6/2005 | Fujioka | 180/65.2 |
| 2005/0178592 A1 * | 8/2005 | Yamamoto et al. | 180/65.2 |
| 2005/0279545 A1 * | 12/2005 | Matsuda | 180/65.2 |
| 2006/0011395 A1 * | 1/2006 | Sugiyama et al. | 180/65.4 |
| 2006/0016627 A1 * | 1/2006 | Robertson | 180/65.1 |
| 2006/0091730 A1 * | 5/2006 | Chiao | 307/10.1 |
| 2006/0102409 A1 * | 5/2006 | Kamada et al. | 180/249 |
| 2008/0135316 A1 * | 6/2006 | Koch et al. | 180/65.2 |
| 2006/0289211 A1 * | 12/2006 | Mashiki | 180/65.2 |
| 2007/0158119 A1 * | 7/2007 | Pascoe | 180/65.2 |
| 2008/0053726 A1 * | 3/2008 | Marsh et al. | 180/65.5 |
| 2008/0142282 A1 * | 6/2008 | Bartilson | 180/65.2 |

\* cited by examiner

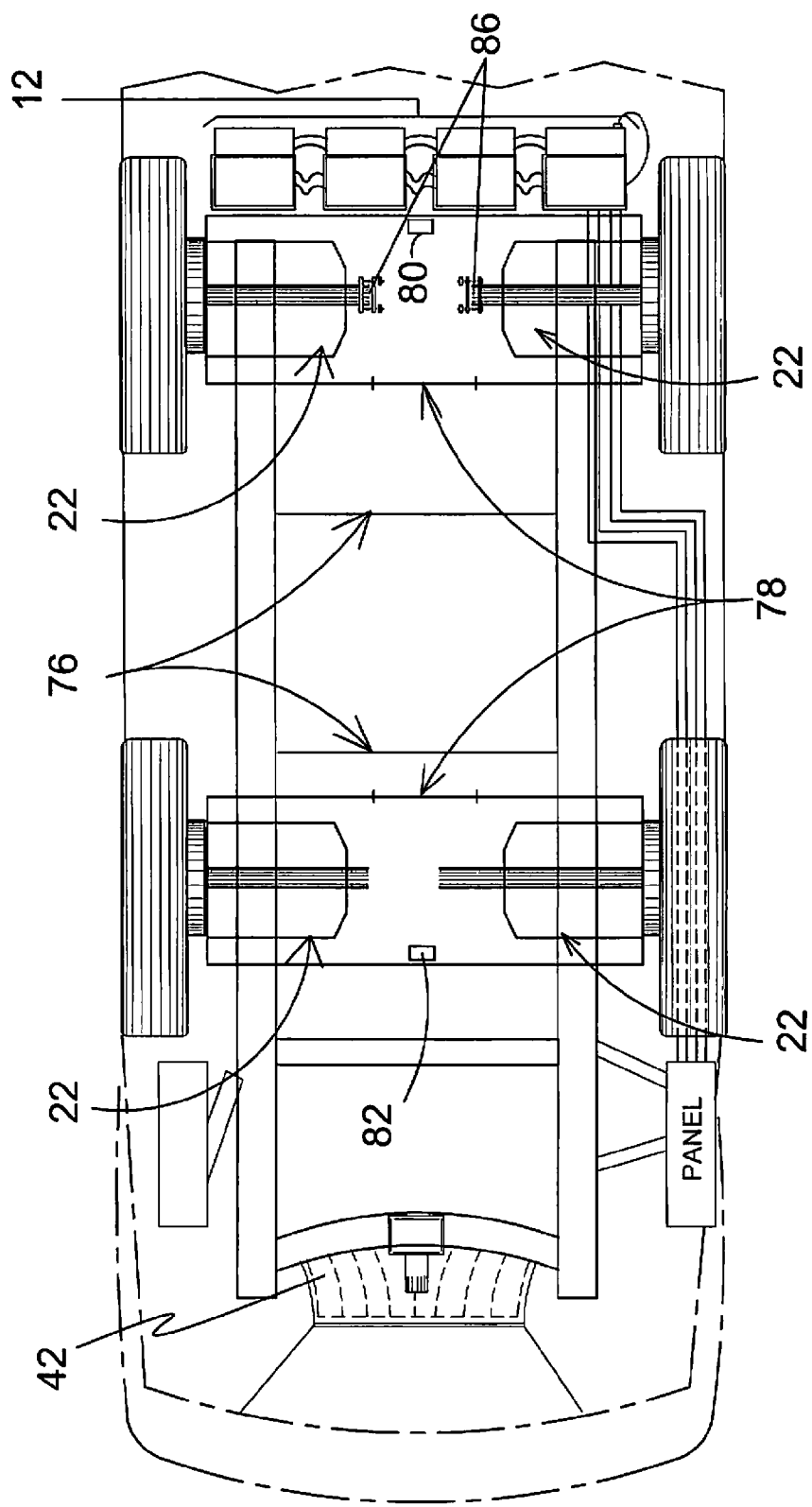

INTERMITTANT ELECTRICAL CHARGING AC/DC DRIVING SYSTEM

BACKGROUND OF THE INVENTION

1. Field of the Invention

The present invention relates generally to a self charging A.C./D.C. and driving system for electrical vehicles and, more specifically, to a system in which the self charging is done at times when the vehicle is either coasting down hill or is having its brakes applied in order (in each case) to slow its forward motion.

2. Description of the Prior Art

To date, electrically powered vehicles have required large batteries (liquid acid) which have needed to be plugged in for long periods of time to recharge them.

Therefore, it is felt that a need exists for a regenerative power system for electric vehicles

SUMMARY OF THE PRESENT INVENTION

The instant invention is an intermittently self charging A.C./D.C. and driving system for battery powered vehicles. This invention takes advantage of those times when it is desired to slow the forward motion of the vehicle such as when going down hill or braking to a stop. By converting the mechanical energy of the forward motion of the vehicle to electrical energy and using that electrical energy at those times to recharge the batteries (which exerts a natural braking action on forward motion), not only can smaller batteries be used to power the vehicle, and the interval at which the batteries must be recharged lengthened, but also wear and tear on the brakes is reduced.

When the brakes are applied or the potential meter is released, a belt attached to the front axle is engaged by the pulley of an AC generator and the rotational energy of the rotating front axle is converted by the AC generator to electrical energy which is then used to charge the batteries. This conversion of rotational energy to electrical energy effectively retards the rotation of the front axle thus causing a braking action which slows the vehicle.

A primary object of the present invention is to provide an intermittently self-charging electrical AC/DC system that will allow smaller batteries to be used, lengthen the time between battery rechargings, and reduce brake wear, thus overcoming some of the shortcomings of the prior art devices.

Another object is to provide a continuous flow of electrical energy (AC/DC) from a sealed battery (jelly or alkaline) through cables, main switch, diodes, capacitors, accumulators, and other components, etc.

Yet another object of the present invention is to provide a safe charging system from AC to DC through a regulator and other components (in a special locked panel box) which control power charge.

Still yet another object of the present invention is to provide cooling of the system load through grids which have blowers to disperse some of the heat generated by the operation of the motor. The remaining heat passes through a special filter to heat the interior of the vehicle.

Another object of the present invention is to provide a vehicle which has zero emissions and is economical in cost to manufacture.

Additional objects of the present invention will appear as the description proceeds.

The present invention overcomes the shortcomings of the prior art by providing a self charging A.C./D.C. and driving system for electrical vehicles and, more specifically, to a system in which the self charging is done at times when the vehicle is either coasting down hill or is having its brakes applied in order (in each case) to slow its forward motion.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIGS. 3A and 3B is an illustrative view of the present invention.

DESCRIPTION OF THE REFERENCED NUMERALS

Figure 1:
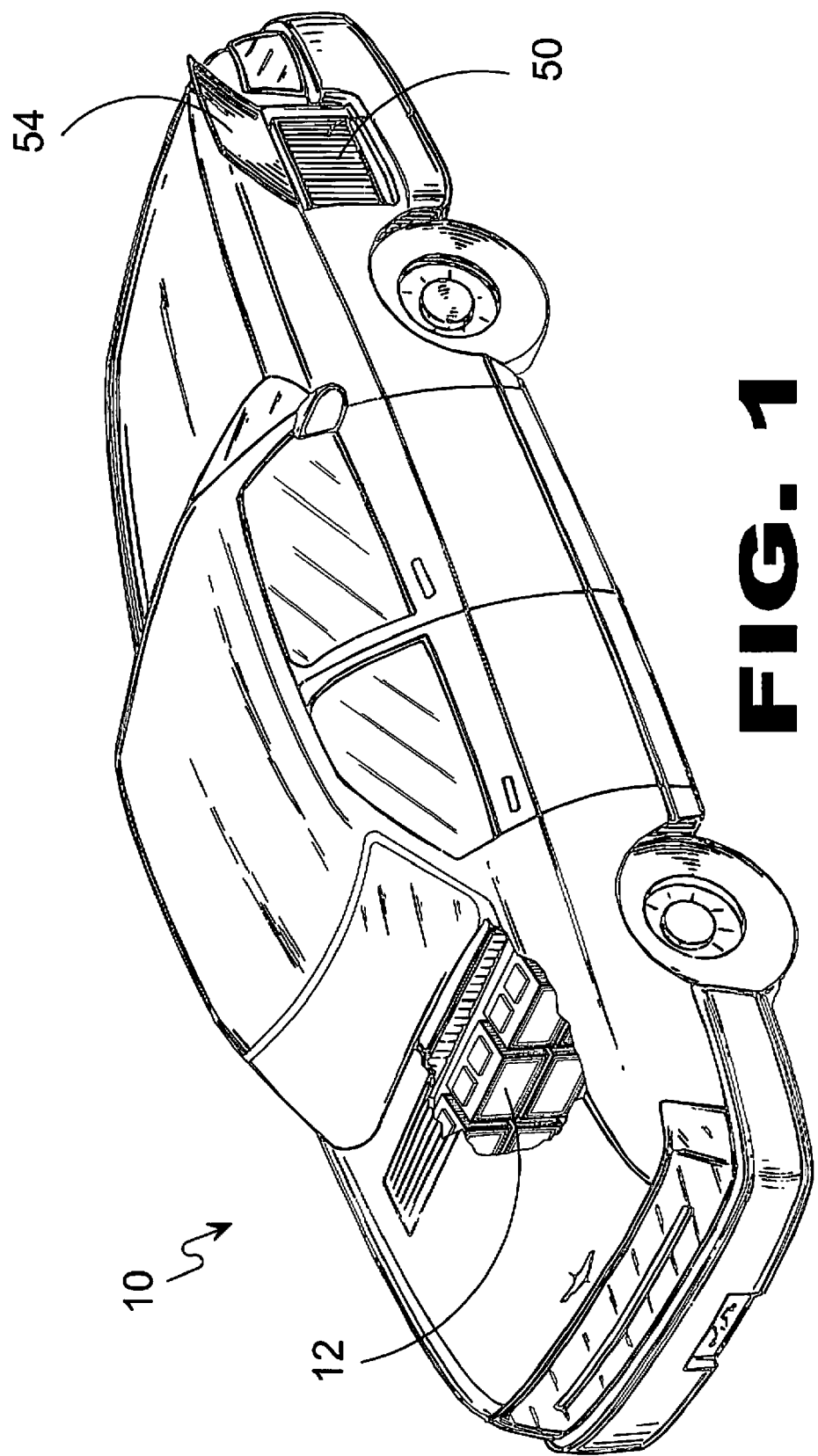
FIG. 1 is a diagrammatic perspective view of a vehicle with parts broken away showing the location of the bank of eight batteries at the rear.

Turning now descriptively to the drawings, in which similar reference characters denote similar elements throughout the several views, the Figures illustrate the self charging A.C./D.C. and driving system for electrical vehicles of the present invention. With regard to the reference numerals used, the following numbering is used throughout the various drawing Figures.

10 self-charging AC/DC driving system for electric vehicles
12 battery bank
14 cables connecting the battery bank to special panel box for supplying power to the motors or for recharging the batteries
18 special panel box
20 belt attached to front axle
22 motors (AC/DC) reversible
24 AC generator pulley
26 generator (AC) reversible
28 front axle
34 cable from special panel box to brushless motors
36 cable from generator to special panel box
38 positraction (not shown—controlled by computer)

40 cooling conduit
42 blower
44 grids
46 special panel
48 power regulator
50 grids filter
52 pipe
54 filter access cover
58 front wheels
60 rear wheels
62 headlights
64 panel electronics
66 AC & DC diode switches
68 breakers
70 capacitors and other components
72 contacts
74 battery charger/accumulator
76 cooling conduit supports
78 access panels
80 rear axle box breathers
82 front axle air breathers
84 rear axle
86 mechanical parking brake

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, behind the rear seat of the vehicle can be seen the bank of eight batteries 12, which are all either 96 volt or 124 volt batteries. Also shown is the filter access door 54 which may be opened when it is desired to change the grids filter 50.

Figure 2:
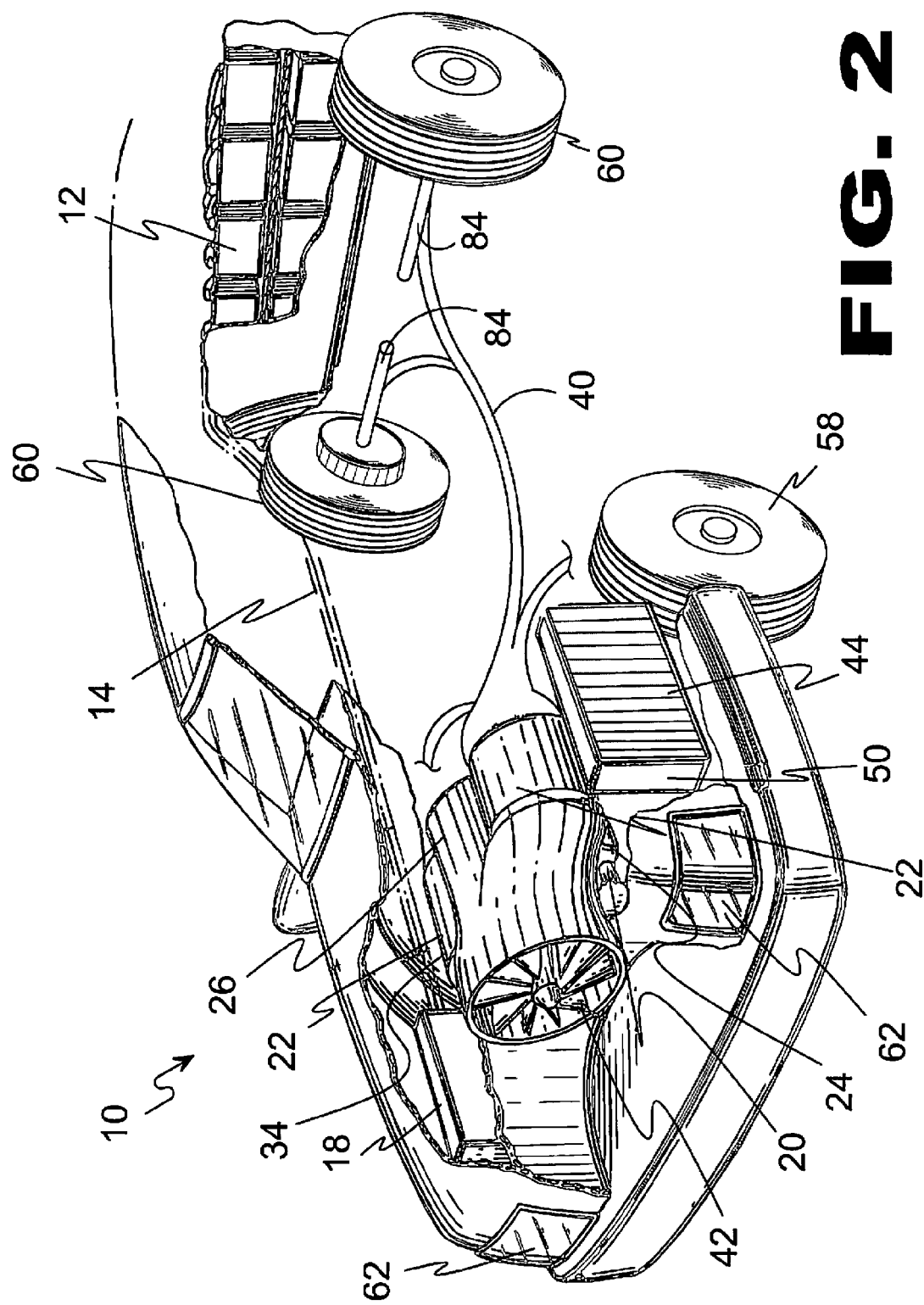
FIG. 2 is a cross sectional view of the vehicle showing the batteries in the battery bank connected by cable to the special panel.

Referring to FIG. 2, the battery bank 12 is shown at the rear of the vehicle. Power is carried through the cables 14 to the special panel box 18. From there it passes to the motors 22 and the positraction 38. Rotation of the rear axle 84 causes the wheels 60 to rotate and the vehicle to move. The headlights 62 are 12 Volt.

Figure 3B:
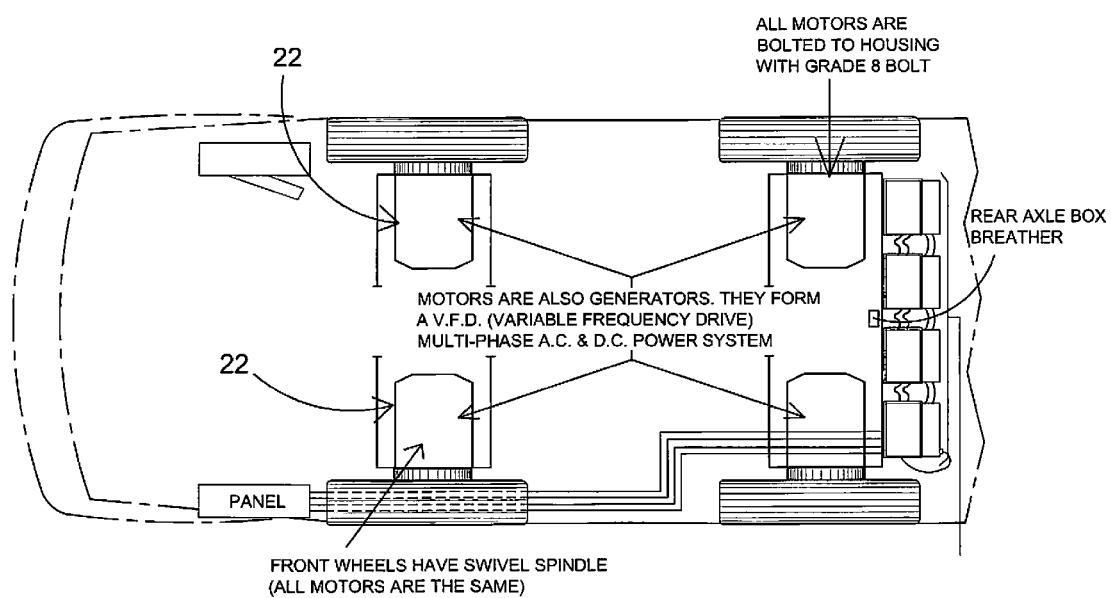
Figure 5:
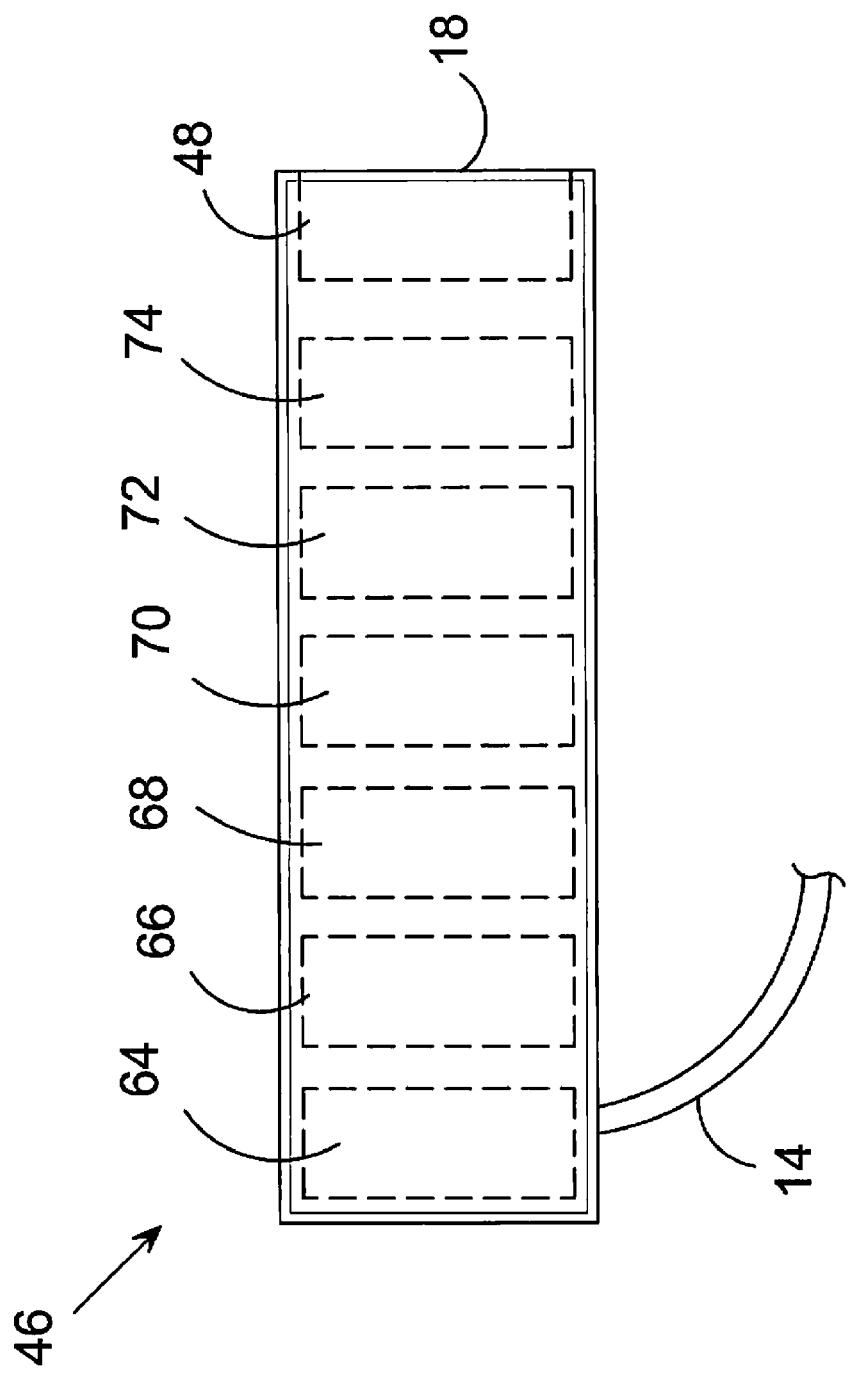
FIG. 5 is a cross sectional view of the special panel which contains the power regulator and other components.

Referring to FIGS. 3A, 3B when the ignition (contact) key is turned on at the main switch, the bank of eight batteries 12 supplies, via cables 14 attached to the positive and negative terminals of the head battery of the battery bank, power to the special panel box 18 which houses the special panel 46 (shown in FIG. 5). Within the special panel 46, which has a positive and negative terminal for receiving power from (or, during a recharge phase, sending power to) the battery bank, the DC power from the battery bank 12 is converted to a suitable form for and supplied, via cable 34, to two brushless motors 22, 22 (which are reversible) (AC/DC). When a lever is moved to the "forward" position from "neutral", these motors 22, "see FIGS. 3A and 3B" cause the positraction 38 to rotate the rear axle 84 and thus the rear wheels 60. Acceleration takes place by utilizing 6 contacts for "Forward". For "Reverse", only one contact is used. When the driver releases his foot from the acceleration pedal such as when the vehicle is coasting down hill, or when the driver presses the foot brake, the pulley 24 of the AC generator 26 (which is also reversible) engages belt 20 which is fixedly attached to the front axle 28, and the AC generator thus converts the rotational energy of the front axle 28 to AC electrical energy. This AC electrical energy in turn is conducted via cable 36 to the special panel 46 inside the special panel box 18. The special panel 46 converts this electric current from AC to DC. Cables 14 attached to the positive and negative terminals of the special panel 46 then conduct this current to the battery bank 12 where the DC current partially recharges these batteries. Thus we see that the mechanical energy of the rotating front axle is converted to electrical energy by the AC generator at those times when it is desired to slow the forward motion of the vehicle. By utilizing this electrical energy to recharge the battery bank, a large mechanical drag is placed on the forward rotation of the front axle thus slowing the vehicle. This leads to two useful results: First, the battery bank is somewhat recharged leading to an increased travel range for the vehicle. Second, there is somewhat reduced wear and tear on the brakes.

Figure 6:
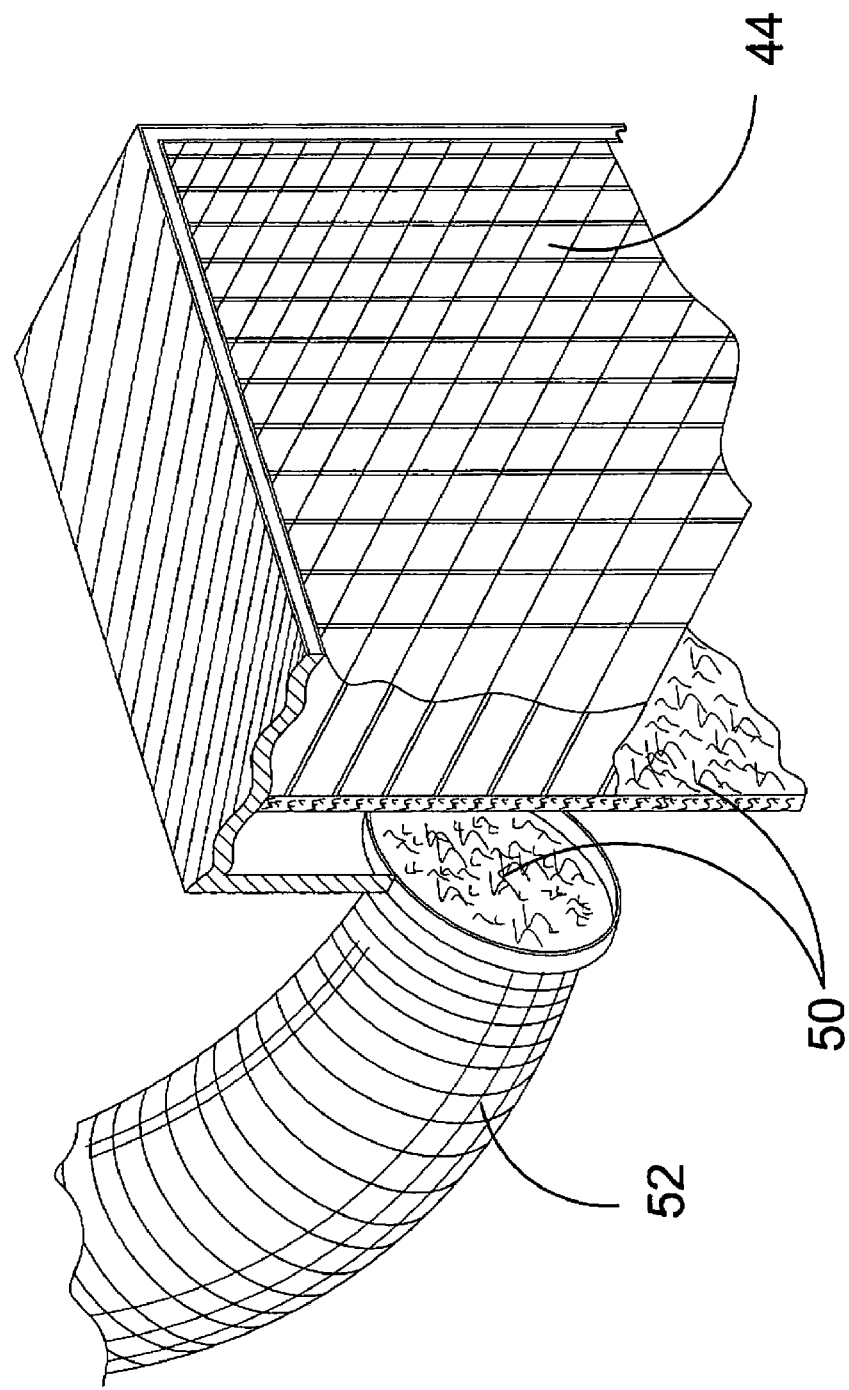
FIG. 6 is a diagrammatic perspective view of the grids filter with parts broken away illustrating the grids filter and the pipe through which warm air is conducted to the interior of the vehicle.

During operation, a separately mounted motor provides power for power steering, power brakes, air conditioning and the blower 42. The blower 42 blows air to both motors/generators 22, 22 and the generator 26 for cooling purposes. The grids 44 prevents overloading of the electrical system when the vehicle is in operation, and also prevent power overload due to overheating during operation. A small fan directs some heat into the interior of the vehicle through a pipe 52 and the grids filter 50, which pipe and grids filter are illustrated in FIG. 6.

Figure 4:
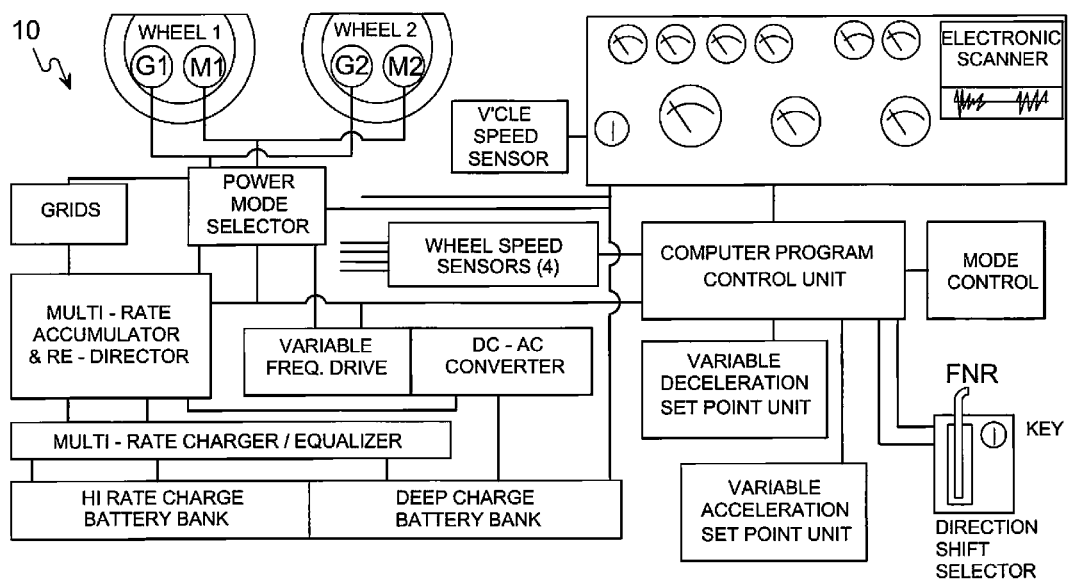
FIG. 4 is an illustrative view of the present invention.

Referring to FIG. 4, shown is the Drive Power System and Regenerative Charging System, M1 and M2 represent two chassis mounted wheel drive motors configured to receive electric power from the Variable Frequency Drive (VFD) multi-phase AC power system via the Power Mode selector unit, responding to the Variable Acceleration Set Point parameter instantaneously determined by the computer. DC potential energy stored in battery banks is translated into AC voltage power by the electronic chopper/converter unit, outputting drive power to wheels in efficient multi-phase, variable frequency AC format via the VFD unit. Wheel speed is instantaneously targeted as a multiple of VFD frequency, and set via computer from the variable accelerator set point parameter. Wheel speed and VFD frequency are computer and VFD compared to produce a speed-target difference signal, used by software error reducing algorithm to optimize achievement of objective speed set point. Under constant vehicle velocity objective conditions, light power is applied to balance frictional or gravity losses, with zero application of the regenerative energy reclaim system. For low rate deceleration objectives, drive power is reduced to balance frictional and gravity gains to the point where, drive power is removed and regenerative energy reclaim applied. Wheel speed and VFD frequency target are computer compared to proportionally set the Variable Accumulator unit, with difference signal again used by software to optimize response time in achieving speed set point. Under rapid deceleration objective conditions, the immediately proceeding process is maximized, resistive dissipation added as necessary, and mechanical braking applied at over threshold conditions.

G1 and G2 represent two wheel-driven physically linked generators, or the generator component of combination motor-generator units, configured to return regenerative power to the system via the Power Mode selector, in proportional response to the variable Deceleration set point parameter. The multi-rate accumulator is specially designed to receive regenerated energy at variable rate and distribute it appropriately to high and low rate energy storage or emergency dissipation devices. A fundamental system component is the variable/multi-rate [energy] Accumulator/Redirector. This compound fast and low rate energy absorber is to relay short term stored energy to the appropriate storage device, including over-threshold energy to the dissipation grid, as well as the converter directly. Mixed characteristic battery banks are utilized, featuring individual high rate and deep charge characteristics. The high rate characteristic essential to maximizing system energy reclaim, while deep charge being important to initial charge storage density. System control involves the dashboard status and key lockup panel reporting electric drive performance, regenerative or charge power processed (stored and/or dissipated), power reclaim efficiency, Battery bank charge state, Charger performance, vehicle speed and miscellaneous electrical systems Trouble/Alarm/Normal status. A lockable gear selector switch provides Forward, Reverse or Neutral command to system electronic control. A variable set point parameter device, functionally similar to a conventional vehicle accelerator, is intended to cause, via computer, drive power to be applied to one or both wheels (depending on 'Posi-traction' Mode Control switch setting). Regenerative charge output is system inhibited under all acceleration conditions, and proportionally enabled as set point is lowered below measured vehicle speed. A variable set point parameter device, functionally similar to a conventional vehicle brake pedal, is intended via computer to provide proportional generator output to Accumulator, and Grids as necessary, utilizing vehicle and wheel speed sensor input. Regenerative output is ideally balanced per wheel contingent on four wheel speeds independently sensed. Wheel drive is disabled and optionally dynamically 'plugged' (reverse powered) under certain deceleration conditions. Overall control of power applied/recharge received is a computerized function designed to maximize conservation and reclaim of stored energy, and minimize escape energy due primarily to incidental and applied friction. Recognizing that the power output/battery recharge cycle is an inherent net loss process, regenerative power is only claimed when drive power is not required, or when kinetic energy is desired to be recaptured as potential energy, without resort to mechanical and electrical heat energy production.

Referring to FIG. 5, shown is a cross section view of the special panel 46 which contains the power regulator 48, contacts, AC/DC diodes, capacitors, breaker accumulator and many additional small components. This panel receives electrical energy from the batteries and converts it prior to supplying it to the motors. This panel also contains a converter to convert power to 12 volts for headlights 62 (shown in FIG. 2) and other instruments, and a converter to convert power for the purpose of intermittently charging the bank of batteries 12 at those times when the accelerator pedal has been released and/or the brakes have been applied.

Referring to FIG. 6, shown is a diagrammatic perspective view of the grids filter 44 with parts broken away illustrating the grids filter 50 and the pipe 52 through which warm air is conducted to the interior of the vehicle.

Figure 7:
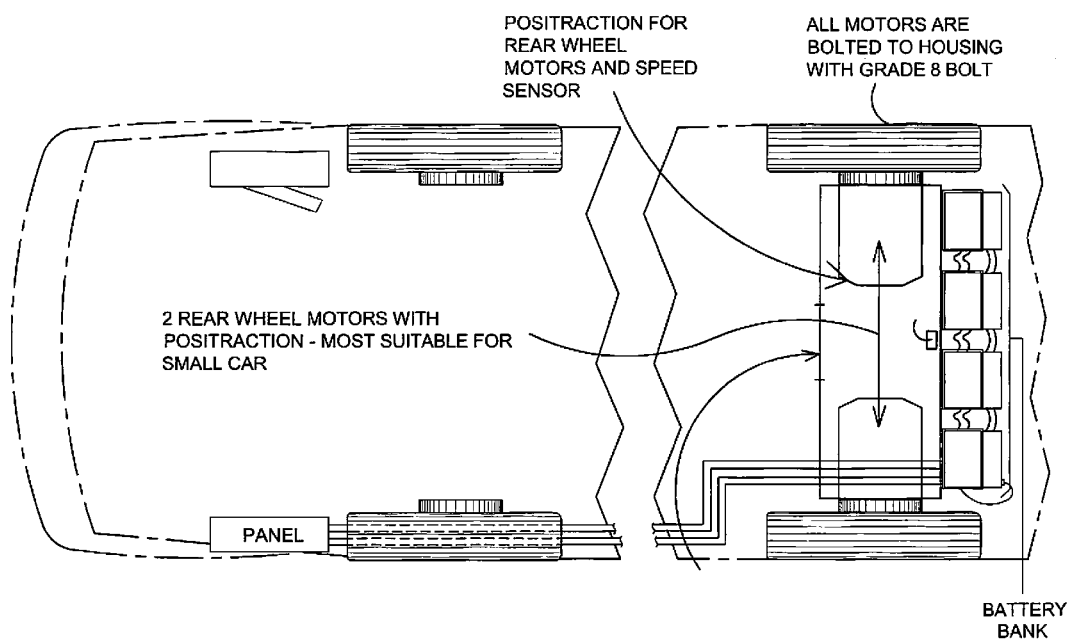
FIG. 7 is a diagrammatic perspective view of the vehicle with parts broken away.

Referring to FIG. 7 when the ignition (contact) key is turned on at the main switch, the bank of eight batteries 12 supplies, via cables 14 attached to the positive and negative terminals of the head battery of the battery bank, power to the special panel box 14 which houses the special panel 46 (shown in FIG. 5). Within the special panel 46, which has a positive and negative terminal for receiving power from (or, during a recharge phase, sending power to) the battery bank, the DC power from the battery bank 12 is converted to a suitable form for and supplied, via cable 34, to two brushless motors 22, 22 (which are reversible) (AC/DC). When a lever is moved to the "forward" position from "neutral", these motors 22, "see FIGS. 3A and 3B" cause the positraction 38 to rotate the rear axle 84 and thus the rear wheels 60. Acceleration takes place by utilizing 6 contacts for "Forward". For "Reverse", only one contact is used. When the driver releases his foot from the acceleration pedal such as when the vehicle is coasting down hill, or when the driver presses the foot brake, the pulley 24 of the AC generator 26 (which is also reversible) engages belt 20 which is fixedly attached to the front axle 28, and the AC generator thus converts the rotational energy of the front axle 28 to AC electrical energy. This AC electrical energy in turn is conducted via cable 36 to the special panel 46 inside the special panel box 18. The special panel 46 converts this electric current from AC to DC. Cables 14 attached to the positive and negative terminals of the special panel 46 then conduct this current to the battery bank 12 where the DC current partially recharges these batteries. Thus we see that the mechanical energy of the rotating front axle is converted to electrical energy by the AC generator at those times when it is desired to slow the forward motion of the vehicle. By utilizing this electrical energy to recharge the battery bank, a large mechanical drag is placed on the forward rotation of the front axle thus slowing the vehicle. This leads to two useful results: First, the battery bank is somewhat recharged leading to an increased travel range for the vehicle. Second, there is somewhat reduced wear and tear on the brakes.

While certain novel features of this invention have been shown and described and are pointed out in the annexed claims, the invention is not intended to be limited to the details above, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that fairly constitute essential characteristics of the generic or specific aspects of this invention.

I claim:

1. An electrical charging and driving system for an electric powered vehicle, comprising:
   a) at least one battery;
   b) at least one motor powered by said battery, said motor connected directly to a rear axle of said vehicle;
   c) a front axle of said vehicle having a belt;
   d) rear wheels rotatively turned by said motor through the rear axle;
   e) generating means for converting the rotatable turning of the front axle into electrical current, said generating means having a pulley;
   f) generator engaging means for enabling the belt on the front axle to engage the pulley of the generating means, whereby the pulley may be rotatably turned by the belt on the front axle;
   g) acceleration means for accelerating the vehicle, said acceleration means comprising an acceleration applied state and an acceleration nonapplied state;
   h) braking means for retarding the forward movement of the vehicle, said braking means comprising a braking applied state and a braking nonapplied state;
   i) means comprising a single charging system responsive to acceleration means and braking means for causing the generator engaging means to enable the belt on the front axle to engage the pulley of the generating means, whenever the acceleration means is in the acceleration nonapplied state or the braking means is in the braking applied state;

j) means for using the current from the generating means to charge the battery; and k) a cooling system in said vehicle comprising a blower in a front of said vehicle for blowing air to said motor and said generator, and having a fan for directing some heat into an interior of said vehicle.

2. The electrical charging and driving system of claim 1, wherein the motor is a brushless motor, said motor being reversible.

3. The electrical charging and driving system of claim 2, wherein the generating means is an AC generator, said AC generator being reversible.

4. An electrical charging and driving system for an electric powered vehicle, comprising:

a) front wheels and rear wheels in said vehicle;

b) each of said rear wheels having an axle with a reversible AC/DC motor mounted thereon and positraction for driving said rear wheels;

c) a bank of batteries mounted in a rear portion of said vehicle;

d) a special panel mounted in a forward section of said vehicle adjacent a side body panel thereof;

e) electrical cables connecting said bank of batteries to said special panel for receiving and sending power to said bank of batteries;

f) a first cable for delivering electrical power to said reversible AC/DC motors from said special panel;

g) a reversible AC generator mounted in a forward portion of said vehicle, said AC generator having a pulley connected thereto;

h) a second cable for delivering electric power from said AC generator to said special panel when said AC generator is driven;

i) a front axle connected to said front wheels;

j) a driving belt fixedly attached to said front axle;

k) said vehicle having an accelerator pedal for transferring electric power from said bank of batteries to said special panel which converts DC power received to AC power for delivery over said first cable to said reversible AC/DC motors to drive said rear wheels;

l) said vehicle having a brake pedal for slowing down said vehicle;

m) a single charging system comprising means for connecting said belt to said pulley to drive said AC generator when a driver releases a foot from the accelerator pedal or said driver presses said brake pedal for delivering AC electrical power to said special panel over said second cable, said special panel converting power received to DC and transferring said DC over said electrical cables to said bank of batteries for recharging said batteries;

n) a cooling system in said vehicle comprising a blower in a front of said vehicle for blowing air to said AC/DC motors and said AC generator, and having a fan for directing some heat into an interior of said vehicle; and o) said vehicle having a control system in which wheel speed and objective speed set point are compared using a software error reducing algorithm to optimize achievement of the objective speed test point.

* * * * *